US006570921B1

United States Patent
Bailleul et al.

(10) Patent No.: US 6,570,921 B1
(45) Date of Patent: May 27, 2003

(54) DATA COMPRESSION ASSEMBLY HAVING SEVERAL DATA-COMPRESSION CHANNELS

(75) Inventors: Nicolas Bailleul, Paris (FR); Etienne Fert, Paris (FR); Pierre Gautier, Paris (FR); Myriam Grandchamp, Montgeron (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/508,302

(22) PCT Filed: Jul. 9, 1999

(86) PCT No.: PCT/EP00/04934

§ 371 (c)(1),
(2), (4) Date: Mar. 9, 2000

(87) PCT Pub. No.: WO00/03548

PCT Pub. Date: Jan. 20, 2000

(30) Foreign Application Priority Data

Jul. 10, 1998 (EP) .................................... 98401765

(51) Int. Cl.$^7$ ................................................ H04N 7/12
(52) U.S. Cl. ................................................ 375/240.07
(58) Field of Search ....................... 375/240.02, 240.07, 375/240.22, 240.23; 348/419.1, 411.1; H04N 7/12

(56) References Cited

U.S. PATENT DOCUMENTS

| | | | | |
|---|---|---|---|---|
| 5,216,503 A | * | 6/1993 | Paik et al. ................ | 348/390.1 |
| 5,500,676 A | * | 3/1996 | Tanaka et al. ............ | 348/386.1 |
| 5,835,149 A | * | 11/1998 | Astle ........................ | 375/240.05 |
| 5,838,686 A | * | 11/1998 | Ozkan ....................... | 370/433 |
| 5,986,712 A | * | 11/1999 | Peterson et al. .......... | 375/240.14 |
| 6,055,270 A | * | 4/2000 | Ozkan et al. .............. | 375/240 |
| 2001/0055336 A1 | * | 12/2001 | Krause et al. ............ | 375/240.11 |

FOREIGN PATENT DOCUMENTS

| | | | | |
|---|---|---|---|---|
| DE | 0 643 971 | * | 3/1995 | .............. H04N/7/24 |
| DE | 0 685 971 | * | 12/1995 | .............. H04N/7/50 |

OTHER PUBLICATIONS

Limin Wang and Andre Vincent; Joint Rate Control For Multi–Program Video Coding; Aug. 1996, IEEE, vol. 42, pp. 300–305.*

* cited by examiner

Primary Examiner—Nhon Diep
(74) Attorney, Agent, or Firm—Russell Gross (57) ABSTRACT

A data compression assembly has several data-compression channels (DCC). The data-compression channels may be, for example, encoders which encode different programs in accordance with an MPEG standard. A data-compression channel comprises a data compressor (CMP) and a buffer-memory space (BUF). The data compressor compresses input data (D) so as to obtain compressed data (Dc). The buffer-memory space temporarily stores the compressed data and provides the compressed data in the form of an output data stream (DS).

Indications (IND) of compressed-data quality (Q[Dc]) versus extent of compression (E[CMP]) are established for respective data-compression channels. A total output bit rate (Rtot) is partitioned over respective output data streams in dependence on these indications. The extent of compression in respective data-compression channels is controlled individually on the basis of output data stream bit rate (R) and amount of compressed data (F) stored in the buffer memory space. This allows a substantially constant quality ratio between the compressed data from respective data-compression channels as well as a substantially constant quality of the compressed data from an individual data-compression channel.

5 Claims, 6 Drawing Sheets

DATA COMPRESSION ASSEMBLY HAVING SEVERAL DATA-COMPRESSION CHANNELS

FIELD OF THE INVENTION

The invention relates to a data-compression assembly having several data-compression channels. The data-compression channels may be, for example, encoders which encode different programs in accordance with a standard of the Moving Pictures Experts Group (MPEG). The encoded programs may be multiplexed so as to form a so-called bouquet. The bouquet may then be transmitted to a receiver which selects a particular program from the bouquet and decodes the selected program.

BACKGROUND ART

The International Application published under number WO 96/20568 describes a video signal encoding apparatus for encoding two or more video signals. The apparatus comprises an encoder stage for each video signal. The encoder stage encodes the video signal as a specified number of data bits per encoded video frame. The encoder stage outputs an encoded video signal at a bit rate determined by the specified number of data bits. A target setting sets specified numbers of data bits for respective encoder stages such that the sum of the respective encoder stage output bit rates remain substantially constant. The respective encoded video signals are written into a buffer memory and are subsequently read from the buffer memory at respectively specified output rates.

The target setting thus provides a joint-bit rate control: a constant overall output bit-rate is maintained despite variations in the individual channel bit rates. The target setting may derive a ratio relating the respective information contents of the video image frames received by the respective encoder stages. The specified number of bits would then be set by dividing a total number of bits available among the channels according to the ratio.

SUMMARY OF THE INVENTION

Let it be assumed that a data compression assembly has several data-compression channels. Let it further be assumed that a data-compression channel comprises a data compressor and a buffer memory space. The data compressor compresses input data so as to obtain compressed data. The buffer-memory space temporarily stores the compressed data and provides the compressed data in the form of an output data stream. The background-art encoding apparatus is an example of such a data-compression assembly.

It is an object of the invention that the data-compression assembly yields a relatively good quality of compressed data. To that end, the invention takes the following aspects into consideration.

Compressed-data quality will generally decrease as the extent to which the data is compressed increases, and vice versa. For example, in MPEG video encoding, the extent to which a picture is compressed depends on a quantization parameter. An encoded picture will comprise relatively few bits if the quantization parameter has a high value. However, the encoded picture will then have a relatively poor resolution. Conversely, an encoded picture have a relatively good resolution if the quantization parameter has a low value. However, the encoded picture will then comprise relatively many bits.

The extent of compression may be controlled, for example, by means of a target. This is done in the background art. A target is a desired number of bits for an encoded picture. The quantization parameter is controlled such that the target is substantially achieved. When encoding a picture, the quantization parameter may need to have a relatively high value in order to achieve the target. In that case, one could say that the picture is difficult to compress. Conversely, the target may be achieved with the quantization parameter having a relatively low value. In that case, one could say that the picture is easy to compress. Thus, supposing that there is a fixed target, a picture which is easy to compress will have a relatively good quality once it has been encoded, whereas a picture which is difficult to compress will have a relatively poor quality.

The background art seems to apply the following principle. There is a total target for each successive set of concurrent pictures which are to be encoded in the different encoding channels. The total target is such that the sum of the respective encoder stage output bit rates remains substantially constant. Thus, the total target should be the same for each set of concurrent pictures. For each set, it is established which pictures are relatively easy to compress and which pictures are relatively difficult to compress. The total target is partitioned among the pictures in the following manner. A picture which is rather difficult to compress is given a relatively high individual target. Conversely, a picture which is relatively easy to compress is given a relatively low individual target. Thus, in a manner of speaking, there is a fixed budget in terms of number of bits to be spend in encoding a set of concurrent pictures. The budget is partitioned such that concurrent compressed pictures have a substantially uniform quality.

The principle applied in the background art has the following inconvenience. It may happen that, at a certain instant, there are relatively many pictures which are difficult to compress whereas, at an other instant, there are relatively few pictures of that kind. Since the total target is constant, pictures which are difficult to compress will have a relatively low individual target at the former instant whereas these pictures will have a relatively high individual target at the latter instant. Consequently, the quality of the compressed pictures will vary in time.

According to the invention, indications of compressed-data quality versus extent of compression are established for respective data-compression channels. A total output bit rate is partitioned over respective output data streams in dependence on these indications. The extent of compression in respective data-compression channels is controlled individually on the basis of output data stream bit rate and amount of compressed data stored in the buffer memory space.

Since, in the invention, the extent of compression in respective data-compression channels is controlled individually, a data compression channel has its own budget in terms of number of bits it can spend for compressing data over a certain future period in time. The budget is determined by the output data stream bit rate and the amount of coded data stored in the buffer memory space. When a data-compression channel receives data which is difficult to compress, the output data stream bit rate of that data-compression channel can be increased. As a result, the budget will increase. How many bits will be spend for encoding a particular data portion is decided by the data-compression channel individually.

Thus, in the invention, the respective encoding channels have flexible budgets and the decision how to spend a budget is locally made. In contrast, in the background art, there is a fixed budget and the decision how to spend the budget is centrally made. Thus, the invention provides greater flexibility in data-compression control. Consequently, the invention allows the respective data-compression channels to better maintain the quality of compressed data at a substantially constant level.

The invention and additional features, which may be optionally used to implement the invention to advantage, are apparent from and will be elucidated with reference to the drawings described hereinafter.

DETAILED DESCRIPTION OF THE DRAWINGS

The following remarks relate to reference signs. Like entities are designated by like letter references in all the Figures. Several similar entities may appear in a single Figure. In that case, a digit or a suffix is added to the letter reference in order to distinguish like entities. The digit or the suffix may be omitted for convenience or it may be replaced by an asterisk in the case where its value is not important (do not care value). This applies to the description as well as the claims.

Figure 1:
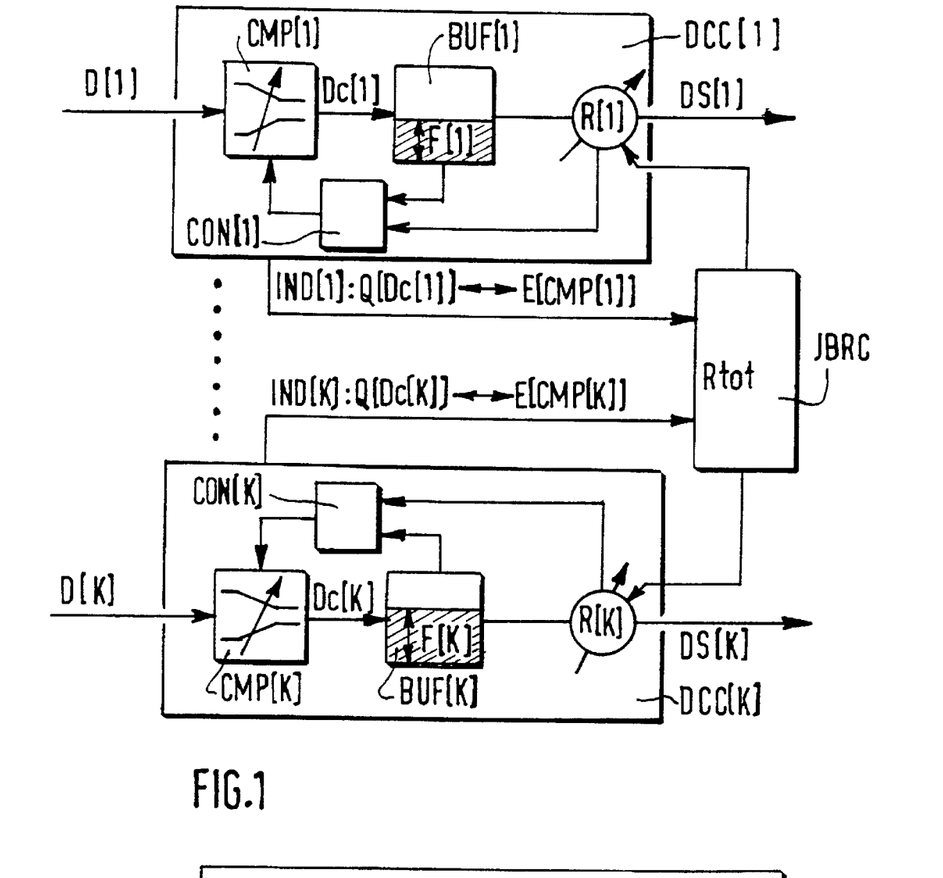
FIG. 1 is a conceptual diagram illustrating basic features of the invention as claimed in claim 1.

FIG. 1 illustrate basic features of the invention in solid lines. A data compression assembly has several data-compression channels DCC. A data-compression channel comprises a data compressor CMP and a buffer-memory space BUF. The data compressor compresses input data D so as to obtain compressed data Dc. The buffer-memory space temporarily stores the compressed data and provides the compressed data in the form of an output data stream DS.

Indications IND of compressed-data quality Q[Dc] versus extent of compression E[CMP] are established for respective data-compression channels. A joint bit-rate controller JBRC partitions a total output bit rate Rtot over respective output data streams DS in dependence on these indications. The extent of compression in respective data-compression channels is controlled individually on the basis of output data stream bit rate R and amount of compressed data F stored in the buffer memory space.

To advantageously implement the features illustrated in FIG. 1, the following aspects have been taken into consideration. It can be said that a data portion is difficult to compress if the data portion can be compressed to a relatively small extent only for a given compressed data quality or if the compressed data quality is relatively poor for a given extent of compression. There are various manners to establish indications of compressed data quality versus extent of compression. For example, these indication may be established on the basis of recent compression experiences. It is then assumed that a data portion will be difficult or easy to compress if a preceding data portion was difficult or easy to compress. This approach will give satisfactory results if there are gradual changes only in terms of difficulty to compress.

Figure 2:
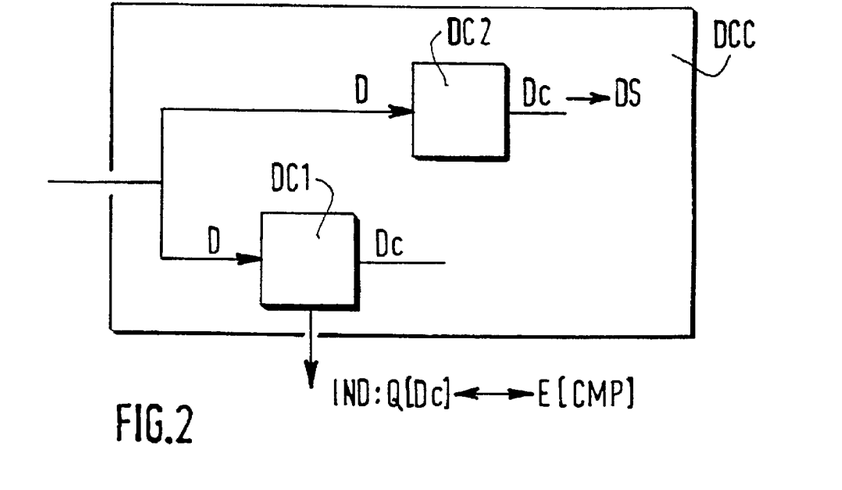
FIG. 2 to is a conceptual diagram illustrating additional features as claimed in claim 2.

FIG. 2 illustrates the following features which may be optionally applied in addition to the features illustrated in FIG. 1. A data-compression channel DCC carries out two types of data compression one after the other. There is a first data compression DC1 for establishing the indication IND of compressed-data quality Q[Dc] versus extent of compression E[CMP]. There is a second data compression DC2 for providing compressed data Dc which will form part of the output data stream DS.

The features illustrated in FIG. 2 provide the following advantages. The indication includes a compression experience for data which has yet to be compressed in order to form part of the data stream. Consequently, the indication will be more up-to-date and thus more precise than an indication which is based on compression of previous data only. Since the indication is more precise, the total bit rate can be partitioned more precisely among the data streams. That is, the partitioning of the total bit rate can better match the needs of the data-compression channels in terms of number of bits. Consequently, the FIG. 2 features contribute to a satisfactory quality.

Figure 3:
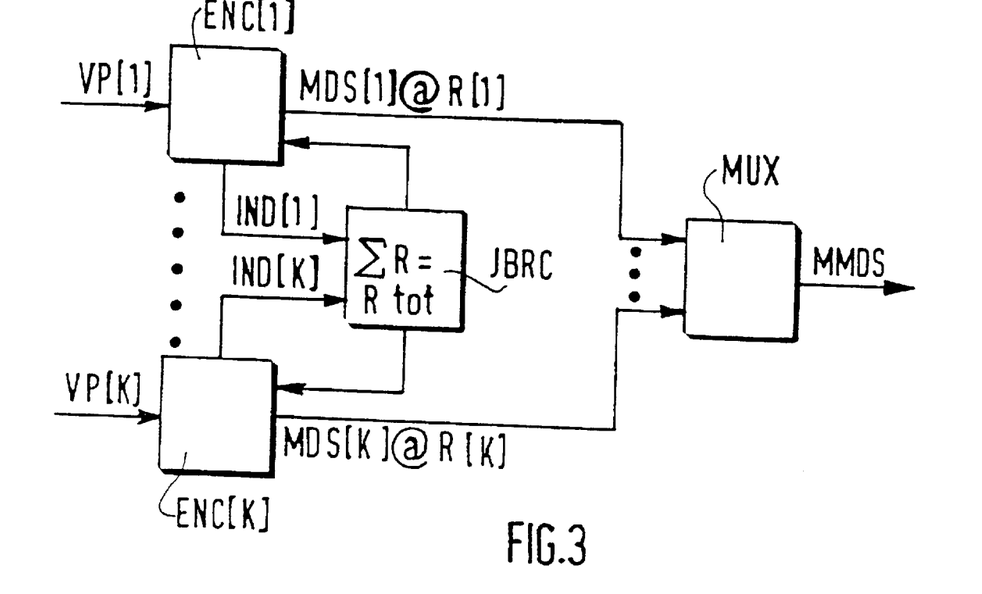
FIG. 3 is a block diagram illustrating an example of a video encoder assembly in accordance with the invention.

FIG. 3 illustrates an example of a video encoder assembly incorporating the features described hereinbefore with reference to FIGS. 1 and 2. The video encoder assembly receives several video programs VP and, in response, provides a multiplex MPEG data stream MMDS. The multiplex MPEG data stream MMDS contains an MPEG encoded version of each video program VP. The video encoder assembly comprises several encoders ENC, a multiplexer MUX and a joint bit-rate controller JBRC.

The video encoder assembly basically operates as follows. Each encoder ENC encodes a different video program and provides an MPEG data stream MDS to the multiplexer. The multiplexer combines the MPEG data streams so as to obtain the multiplex MPEG data stream MMDS. Each encoder further establishes a bit-rate control indication IND with each picture in the video program it encodes. The bit-rate control indication is an estimation of how difficult it is, or how easy, to encode the current picture and a number subsequent pictures. A picture is difficult or easy to encode if, for a given quality, the coding of the picture produces relatively many or relatively few bits, respectively.

The joint bit-rate controller partitions a total bit rate Rtot among the video encoders on the basis of the bit-rate control indications it receives. That is, the joint bit-rate controller allocates a certain bit rate R to each encoder, the sum of these bit rates being the total bit rate. An encoder supplies its MPEG data stream to the multiplexer at the bit rate it has been allocated. The joint bit-rate controller will allocate a higher bit-rate to an encoder receiving pictures which are difficult to encode than an encoder receiving pictures which are easy to encode. By doing so, the joint bit-rate controller maintains a substantially constant quality ratio between encoded pictures provided by the respective encoders. Furthermore, the joint bit-rate controller helps the respective encoders to provide successive encoded pictures at a substantially constant quality. This will be explained in greater detail hereinafter.

Figure 4:
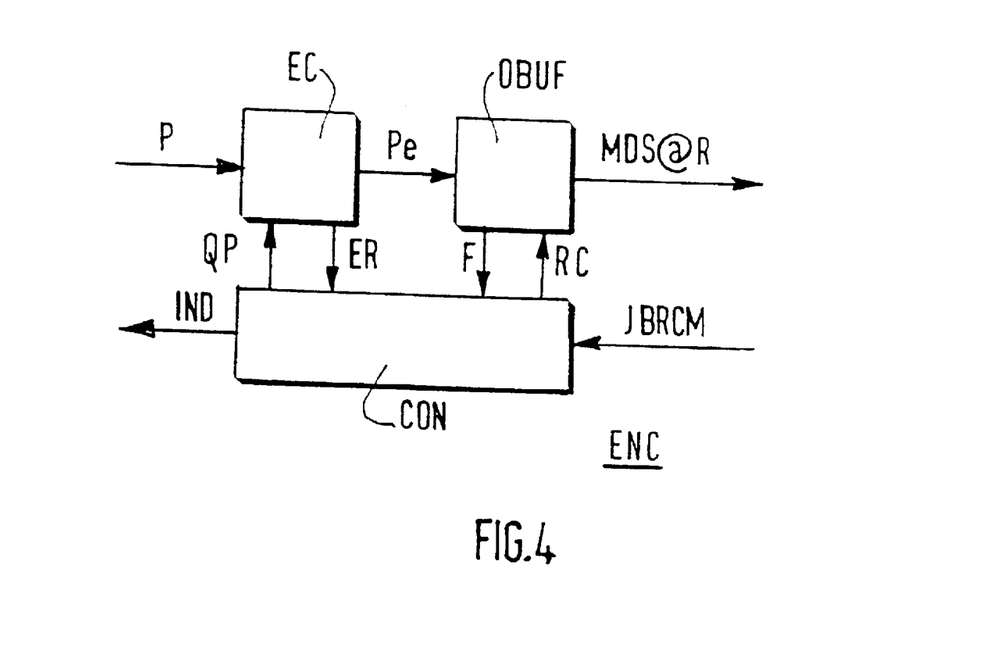
FIG. 4 is a block diagram illustrating an encoder which forms part of the video encoder assembly illustrated in FIG. 3.

FIG. 4 illustrates an encoder ENC which forms part of the video encoder assembly illustrated in FIG. 3. The encoder comprises encoding circuitry EC, an output buffer OBUF and a controller CON. It basically operates as follows. The encoding circuitry encodes successive pictures P in dependence on a quantization parameter QP. The encoding circuitry supplies encoded pictures Pe to the output buffer OBUF. The output buffer outputs the encoded pictures in the form of an MPEG data stream having a bit rate R.

There are three types of encoding in accordance with which a picture may be encoded: I-type, P-type and B-type encoding. A picture which is I-type, P-type or B-type encoded will be referred to as I-, P- and B-picture, respectively, hereinafter. Furthermore, there is a cyclic pattern in the type of encoding which is applied. Each cycle begins with an I-type encoding and is followed by one or more P- and B-type encodings. A cycle covers N pictures, N being an integer. For example, for N=6, the cyclic encoding pattern may be I-B-B-P-B-B.

The controller controls the bit rate on the basis of joint-bit rate control messages JBRCM it receives from the joint bit-rate controller. A joint bit-rate control message defines a bit rate for the encoder and further defines when this bit rate has to be applied. Thus, in effect, the joint-bit rate control messages define a bit rate profile for the encoder. The controller controls the bit rate in accordance with the bit-rate profile. It does so by means of a bit-rate control signal RC which determines the rate at which encoded picture data is read from the output buffer.

The quantization parameter substantially determines the quality of the encoded pictures. The lower its value while encoding a picture, the higher the quality of the encoded picture is, but the more bits the encoded picture will comprise. The quantization parameter should preferably have a value which is substantially constant and as low as possible without causing underflow or overflow in an input buffer of a decoder receiving the MPEG data stream.

The controller controls the quantization parameter on the basis of several parameters. One parameter is the bit-rate profile as defined by the joint bit-rate control messages. Another parameter is the amount of encoded data F contained in the output buffer. These two parameters define the room, in terms of number of bits, which is available for encoding a group of pictures. Another parameter used for quantization parameter control, are encoding results ER. The encoding results provide information on how to partition the available room among the pictures such that the quantization parameter has a substantially constant value. An encoding result for a picture, or a portion thereof, may be expressed as follows: the number of bits produced by the encoding of the picture, or its portion, multiplied by the quantization parameter value which has been applied. This product will hereinafter be referred to as complexity.

The encoder may operate in a single-pass mode or in a double-pass mode. In the single pass mode, the encoding circuitry encodes a pictures only once. That is, a picture passes the encoding circuitry, as it were, only once. During that single pass, the controller controls the quantization parameter using encoding results relating to previous pictures only. In the double-pass mode, the encoding circuitry encodes a picture twice. That is, a picture passes the encoding circuitry, as it were, twice. In the first pass, the picture is encoded while the controller applies a fixed quantization parameter. The first pass serves to obtain encoding results relating to the picture. In the second pass, the controller controls the quantization parameter as described hereinbefore using the encoding results obtained in the first pass. Thus, the quantization parameter control will generally be better in the double pass mode than in the single pass mode.

Figure 5:
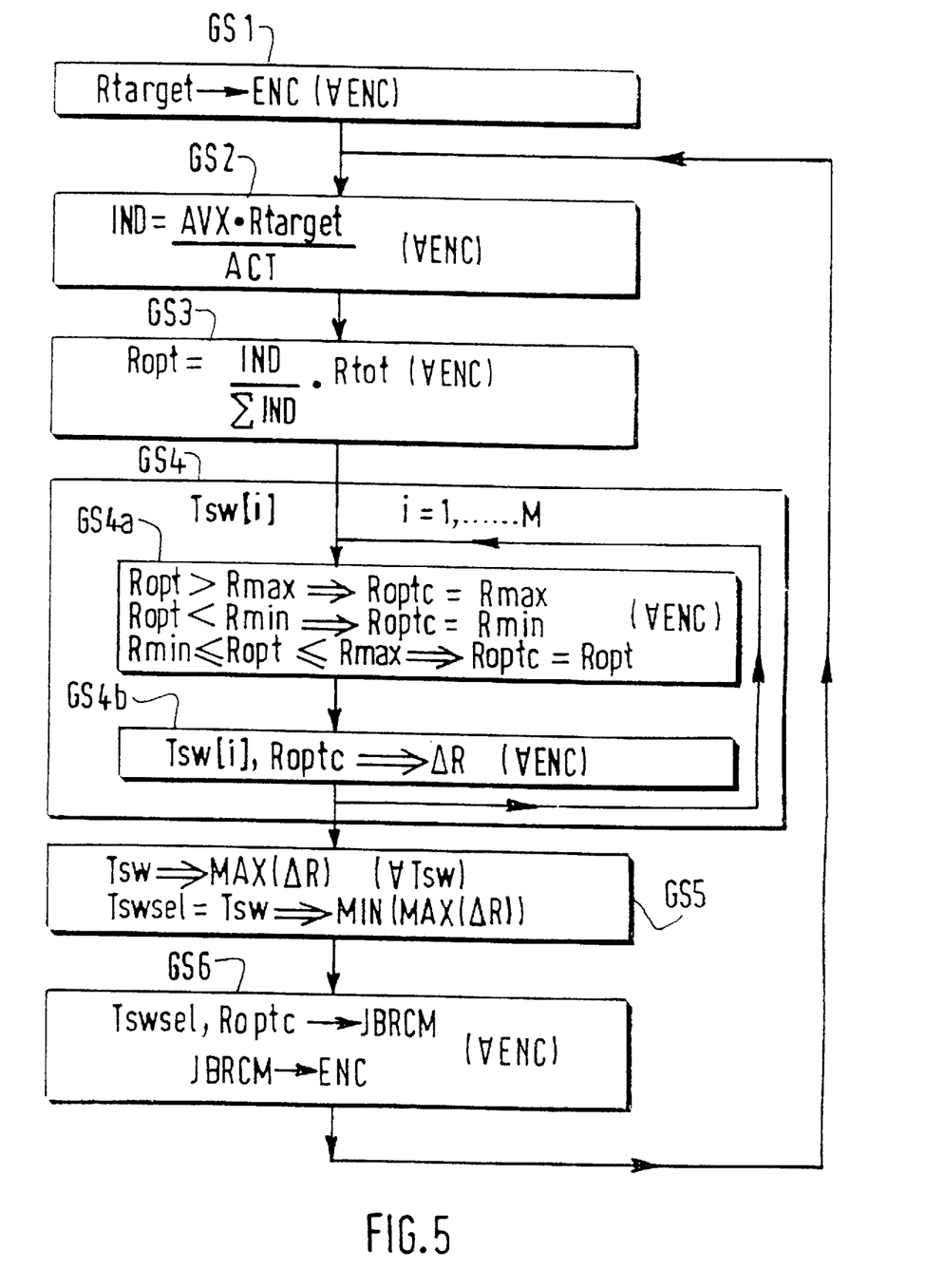
FIG. 5 is a flow chart illustrating a method of joint bit-rate control for the video encoder assembly illustrated in FIG. 3.

The controller further establishes a bit-rate control indication IND with each picture to be encoded. In the single-pass mode, the encoder establishes the bit-rate control indication on the basis of encoding results relating to preceding pictures only. In the dual-pass mode, the encoder establishes the bit-rate control indication on the basis of encoding results which include an encoding result of the current picture. FIG. 5 illustrates a method of joint bit-rate control for the video encoder assembly illustrated in FIG. 3. In an initialization step GS1, the joint-bit rate controller assigns a target bit rate Rtarget to each encoder ENC. The target bit rate Rtarget determines the average quality of the encoded pictures provided by the encoder concerned.

The following series of steps are carried out repetitively. For example, they may be carried out every picture period. In an indication-calculation step GS2, each encoder calculates a bit-rate control indication IND and sends the bit-rate control indication to the joint bit-rate controller. The bit-rate control indication may be calculated as follows. The bit-rate control indication is an average picture complexity AVX multiplied by the target bit rate for the encoder divided by a measure of luminance entropy ACT. The average picture complexity is calculated as follows. It is assumed that for the N−1 subsequent pictures each I-, P- and B-picture has a complexity which is that of the most recent encoded I-, P- and B-picture, respectively. The average picture complexity is then the average complexity of the current picture and the N−1 subsequent pictures. The luminance entropy is the average of macro block activities in the most recent encoded picture which is the previous picture in the single-pass mode or the current picture in the dual-pass mode. Macro block activity is defined in the document ISO/IEC JTC1/SC29/WG11/N0400, April 1993, "Test Model 5, Draft Revision 2", section 5.2.2, page 60.

In a bit-rate calculation step GS3, the joint bit-rate controller calculates, for each encoder, an optimal bit rate Ropt which should ideally be allocated to the encoder. The optimal bit rate for an encoder is the bit-rate control indication of the encoder divided by the sum of all bit-rate control indications multiplied by the total bit-rate. Thus, in effect, the optimal bit rate is a portion of the total bit rate. The size of the portion corresponds to the contribution which the bit-rate control indication makes to the sum of all bit rate control indications.

In switch-time examination step GS4, a number of different switch times Tsw are examined. A switch time is an instant when the bit-rates of the respective MPEG data streams may be modified. Some switch times, or even all switch times, may be sooner than the current instant plus a constant end-to-end delay. The constant end-to-end delay is the difference between the instant when an encoded picture is written into the output buffer of an encoder, and the instant when the encoded picture is read from an input buffer of a hypothetical decoder which is directly coupled to the encoder. That is, there is no transmission delay between the encoder and the hypothetical decoder.

The switch-time examination step GS4 comprises two sub-steps which are carried out for each switch time individually.

In a bit-rate clipping sub-step GS4a, the joint bit rate controller establishes a clipped optimal bit rate Roptc for each encoder in the following manner. The joint-bit rate controller first calculates a maximum new bit rate Rmax and a minimum new bit rate Rmin for MPEG-2 compliance of the encoder. The encoder is MPEG-2 compliant if the MPEG data stream it provides neither causes underflow nor overflow in a decoder input buffer. Overflow will occur if the new bit rate exceeds the maximum new bit rate and underflow will occur if the bit new rate is below the minimum new bit rate. The manner in which the joint bit-rate controller calculates the minimum new bit rate and the maximum new bit rate will be explained in greater detail hereinafter. The clipped optimal bit rate is the optimal bit rate defined hereinbefore unless the optimal bit rate causes underflow or overflow. In that case, the clipped optimal bit rate is the minimum bit rate or the maximum bit rate, respectively.

In a delta-rate calculation sub-step GS4b, the joint bit rate controller calculates for each encoder a delta rate $\Delta R$. It is assumed that the bit rate is switched to the clipped optimal bit rate at the switch time under investigation. The joint bit-rate controller calculates the average bit rate which will then be obtained over a time interval covering the current picture and the N−1 subsequent pictures. The delta rate is difference between the optimal bit rate and the average bit rate thus calculated. Ideally, the delta rate should be zero for each encoder.

In a switch-time selection step GS5, one of the investigated switch times is selected in the following manner. For each switch time, it is established which delta rate has highest value. This delta rate will be referred to as maximum delta rate. The higher the delta rate is, the more the bit rate concerned deviates from the optimal bit rate and, therefore, the greater the deviation from a desired quality ratio between the MPEG data streams. The switch time for which the maximum delta rate has the lowest value, is selected: Tswsel=Tsw$\Rightarrow$MIN(MAX($\Delta R$)).

In a bit-rate control step GS6, the joint bit-rate controller sends a joint bit-rate control message JBRCM to each encoder. The joint bit-rate control message specifies the selected switch time. It further specifies the clipped optimal bit rate for the encoder which applies to the selected switch time. Thus, the joint-bit rate controller programs each encoder to provide its MPEG data stream at the clipped optimal bit rate once the selected switch time is reached. Until that time, the respective encoders output their MPEG data streams as defined in previous bit-rate control messages.

Figure 6:
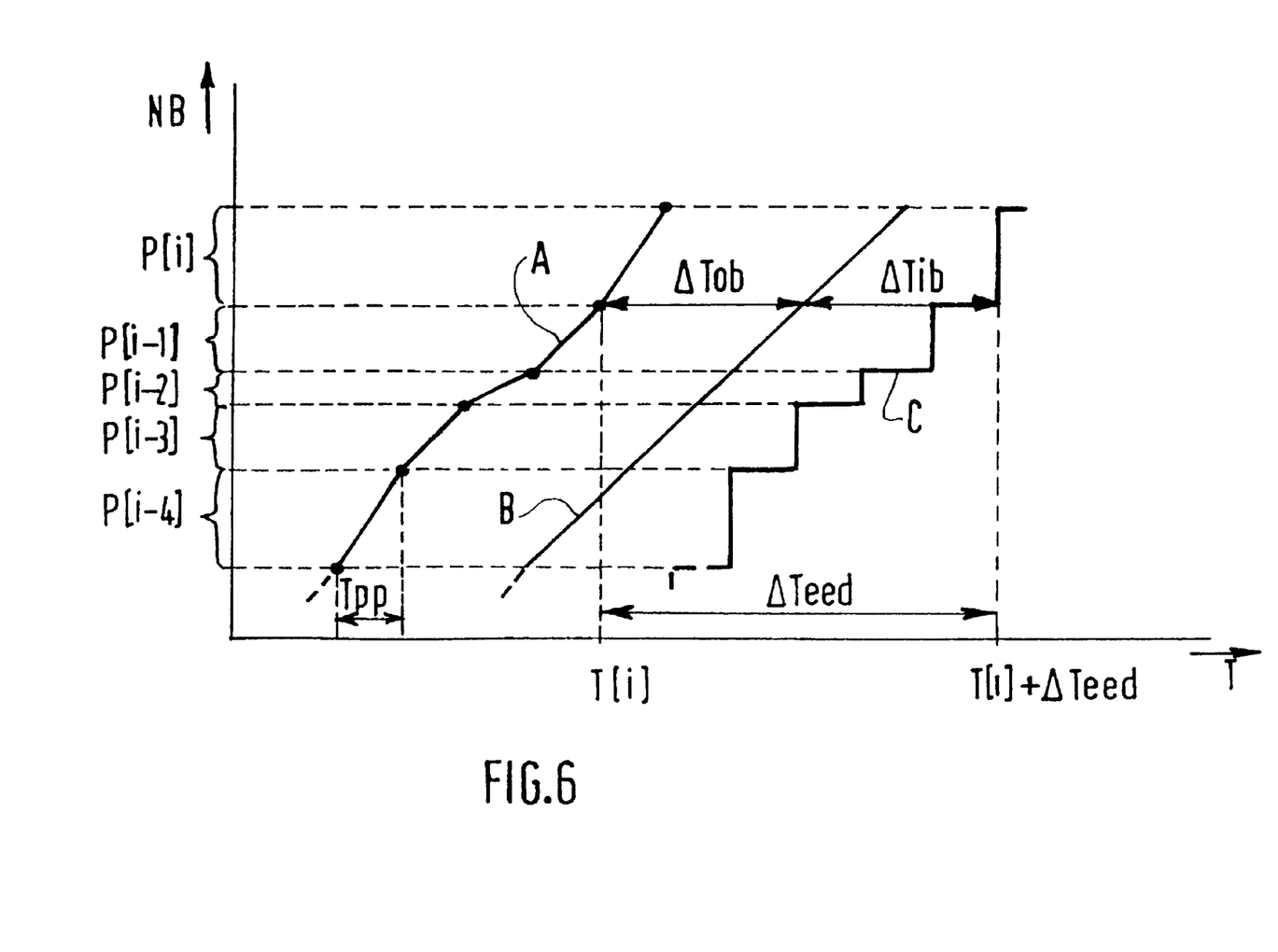
FIG. 6 is a graph illustrating, for an encoder in the video encoder assembly illustrated in FIG. 3, transfer of encoded data via the output buffer of the encoder and via the input buffer of a hypothetical decoder.

FIG. 6 illustrates, for an encoder in the video encoder assembly illustrated in FIG. 3, transfer of encoded data via the output buffer of the encoder and via the input buffer of a hypothetical decoder. FIG. 6 is a graph of which the horizontal axis represents time T and of which the vertical axis represents amount of encoded data NB produced by the encoder in terms of number of bits. The vertical axis further indicates to which picture P the encoded data belongs. The amount of encoded data grows with each successive picture P which has been encoded.

The graph illustrated in FIG. 6 comprises three curves: A, B and C. Curve A represents encoded data which is written into the output buffer of the encoder. For example, curve A shows that encoded data belonging to picture P[i] is written into the output buffer at instant T[i]. Each picture period Tpp, a new picture is written into the output buffer.

Curve B represents encoded data which is read from the output buffer so as to form the MPEG data stream. The slope of curve B is defined by the bit rate of the MPEG data stream. Curve B shows, for example, that encoded data belonging to picture P[i] is read from the output buffer after a delay $\Delta$Tob with respect to instant T[i]. It is assumed that the hypothetical decoder receives the MPEG data stream without any transmission delay. As a result, curve B also represents encoded data which is written into the input buffer of this decoder. That is, picture P[i] is written into the input buffer at instant T[i]+$\Delta$Tob.

Curve C represents encoded data which is read from the input buffer of the hypothetical decoder. It is assumed that a picture is read instantly from the input buffer. That is, it takes no time to read a picture. For example, curve C shows that encoded data belonging to picture P[i] is instantly read from the input buffer at instant T[i]+$\Delta$Teed. $\Delta$Teed represents a constant end-to-end delay. The constant end-to-end delay is thus the difference between the instant when a picture has been written into the output buffer of the encoder, and the instant when a picture has been read from the input buffer of the hypothetical decoder. It holds that $\Delta$Teed=$\Delta$Tob+$\Delta$Tib, $\Delta$Tib representing an input buffer delay. The input buffer delay defines when a picture should be read from an input buffer of a decoder.

At any instant, the amount of data contained in the input buffer of the hypothetical decoder is the difference between curve B and C at that instant. For MPEG compliance, this amount of data should remain between an upper bound and a lower bound. If this is the case, it is ensured that any MPEG-compliant decoder which receives the MPEG data stream will neither underflow or overflow. In this respect, any transmission delay between encoder and decoder plays no role. This is because the MPEG data stream comprises control words which define for each picture when the picture has to be read from the input buffer. These control words define $\Delta$Tib for each picture such that $\Delta$Tob+$\Delta$Tib=$\Delta$Teed. Consequently, it always holds that the amount of data contained in the input buffer of the hypothetical decoder, will also be contained in the input buffer of a real decoder after a delay $\Delta$Ttrans, $\Delta$Ttrans being the transmission delay. Consequently, if the input buffer of the hypothetical decoder never underflows nor overflows, the input buffer of the real decoder will neither.

Let it be assumed that the current time is instant T[i]: picture P[i] is just about to be encoded and, consequently, just about to be written into the output buffer of the encoder. This implies that any instant later than T[i] is the future. It has already been mentioned that any encoded picture which is written into the output buffer will be read from the input buffer after a delay $\Delta$Teed. Consequently, the future of curve C can exactly be predicted within a time interval which extends $\Delta$Teed from the current time. It solely depends on the future of curve B within the same time interval whether there will be underflow or overflow, or neither of those two. The future of curve B is defined by a bit rate profile for the MPEG data stream. The bit rate profile is determined by the joint bit-rate controller as explained hereinbefore with reference to FIG. 5.

Figure 7:
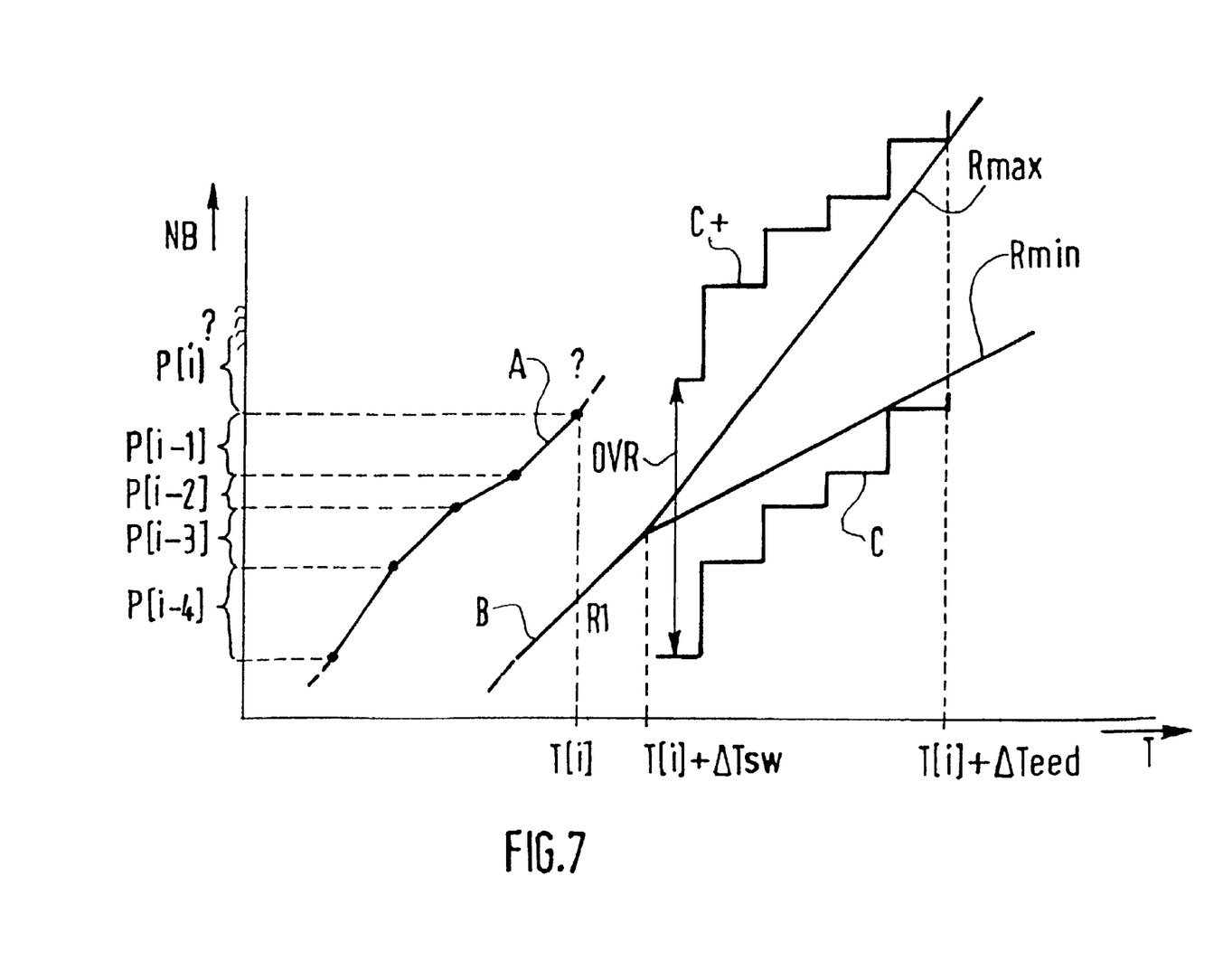
FIG. 7 is a graph illustrating a method of calculating a minimum new bit rate and a maximum new bit rate for an encoder in the FIG. 3 video encoder assembly.

FIG. 7 illustrates a method of calculating a minimum new bit rate and a maximum new bit rate for an encoder in the FIG. 3 video encoder assembly. The calculation applies for a bit-rate switch at a future instant T[i]+$\Delta$Tsw, with $\Delta$Tsw being comprised between 0 and $\Delta$Teed. FIG. 7 is a graph which recaptures the features of the graph illustrated in FIG. 6. For the sake of simplicity, it is assumed that the bit rate is substantially constant and equal to R1 until T[i]+$\Delta$Tsw. The amount of data below which the input buffer will underflow is supposed to be zero. The amount of data beyond which the input buffer will overflow is supposed to be OVR. The graph illustrated in FIG. 7 comprises a curve C+ which is curve C lifted by an amount equal to OVR.

Curve B is extended with two slopes: Rmin and Rmax. Slope Rmin indicates the minimum new bit rate below which underflow will occur. Slope Rmin touches one point of curve C only. If slope Rmin were less steep, underflow would occur. Slope Rmax indicates the maximum new bit rate beyond which overflow will occur. Slope Rmax touches one point of curve C+ only. If slope Rmax were steeper, overflow would occur.

The joint bit-rate controller can calculate curve C and C+ for each encoder on the basis of messages provided by the encoder. A message may, for example, indicate the amount of encoded data contained in an encoded picture and the instant when the encoded picture will be read from the input buffer of the hypothetical decoder. The joint bit-rate controller can also calculate curve B until the instant T[i]+ΔTsw on the basis of the bit-rate profile of the encoder. The bit-rate profile is determined by the joint-bit rate controller itself. Thus, for calculation of curve B, it is sufficient that the joint-bit rate controller memorizes the bit-rate control messages it has supplied to the encoder in a recent past. Once curve C and C+ have been calculated for the time interval between T[i] and T[i]+ΔTeed, and curve B has been calculated for the time interval between T[i] and T[i]+ΔTsw, the joint bit rate controller can calculate the minimum and maximum new bit rate which may be applied at the switch time T[i]+ΔTsw.

Figure 8:
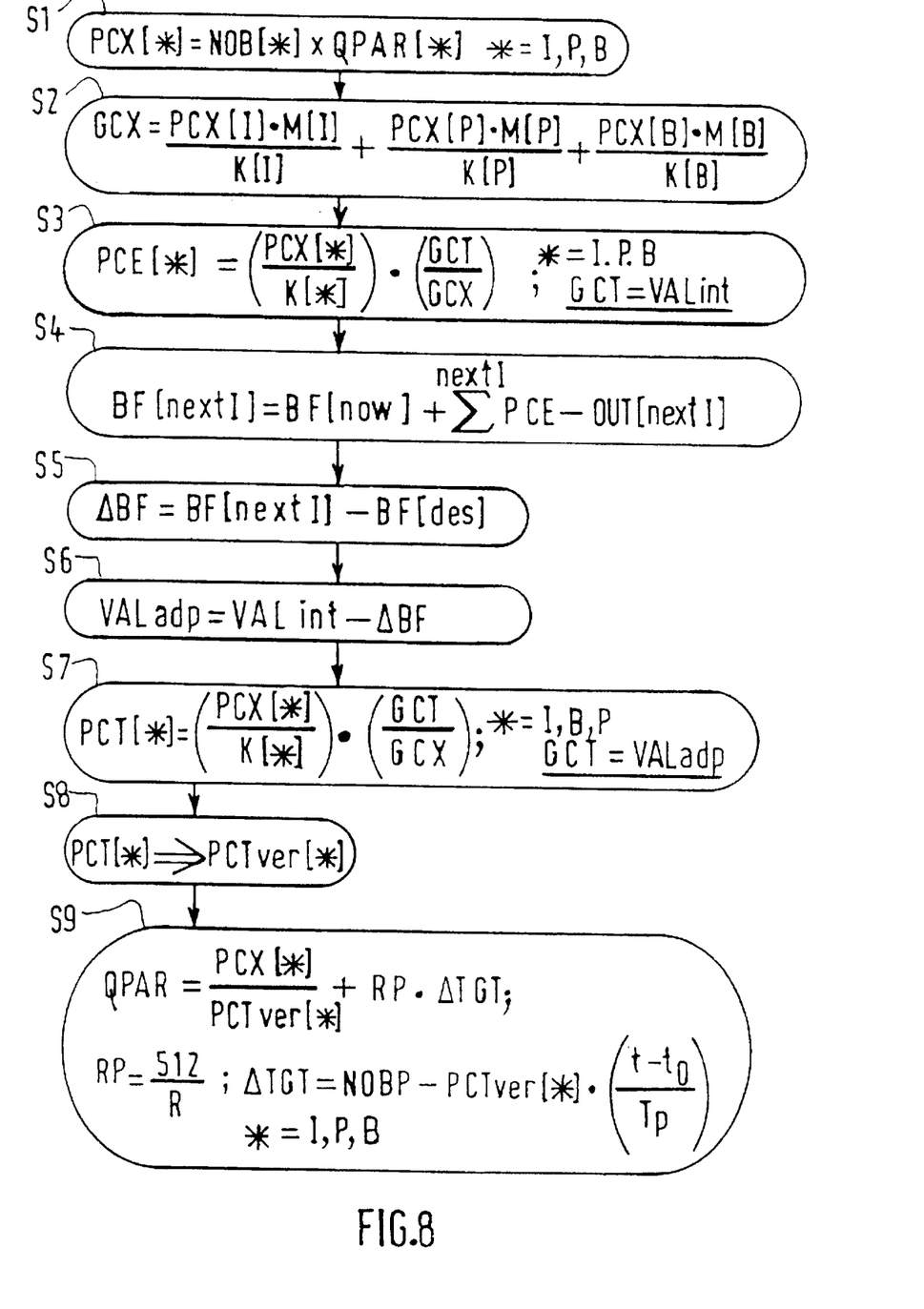
FIG. 8 is a flow chart illustrating an example of a method of quantization parameter control for the encoder illustrated in FIG. 4.

FIG. 8 illustrates an example of a method of quantization parameter control in the encoder illustrated in FIG. 4. The method comprises a plurality of steps S1–S9 which are carried out for each picture P. The steps S1–S9 may also be carried out for each slice in the picture P. It is assumed that the encoder operates in the single pass mode described hereinbefore. It should be noted that, in MPEG, there are three different types of encoding a picture: an I-type encoding, a P-type encoding and a B-type encoding. A picture which undergoes an I-type, P-type or B-type encoding will be referred to as a type I, P or B picture, respectively.

In a step S1, a picture complexity PCX is calculated for each type of picture I, P and B. Each picture complexity PCX is a product of the number of bits NOB produced by a recent encoding and the quantization parameter value QPAR used in the recent encoding. Each picture complexity PCX is in fact a past encoding experience for the type of encoding concerned. It can be used to predict, for a certain quantization parameter value QPAR, which number of output bits will be obtained if a subsequent picture is encoded. The picture complexity PCX for the type encoding to be used, may be divided by the quantization parameter value QPAR. The outcome of this division is a prediction, based on the past encoding experience, of the number of output bits which will be obtained.

In a step S2, a group-of-pictures complexity GCX is calculated. The group-of-pictures complexity GCX is the sum of three terms. Each term relates to a different picture type and is the picture complexity PCX of the type concerned, multiplied by the number M of pictures of the type concerned within a group of pictures, divided by a weighing factor K for the type concerned. The group-of-pictures complexity GCX is also in fact a past encoding experience, broader than the picture complexity PCX, which can be used to calculate a value for the quantization parameter QPAR. For example, the group-of-pictures complexity GCX may be divided by a desired number of output bits to be obtained for N subsequent pictures. Accordingly, a value for the quantization parameter QPAR is obtained with which, based on past encoding experience, the encoding of the N subsequent pictures should produce the desired number of bits. The latter, however, need not be so.

In a step S3, a picture-coding estimation PCE is calculated for each type of picture I, P and B. The picture-coding estimation PCE is product of a first and a second term. The first term is the picture complexity PCX of the type concerned divided by the weighing factor K of the type concerned. The second term is an initial value VALint for a group encoding-target GCT divided by the group-of-pictures complexity GCX calculated in step S2. The group encoding-target GCT is the number of bits which should be obtained by encoding the current picture and the N−1 subsequent pictures. The initial value VALint for the group encoding-target GCT is the number of bits which will be outputted from the output buffer during a period covering the current picture and the N−1 subsequent pictures. Thus, the picture-coding estimation PCE is based on the following target: the amount of data which goes into the output buffer OBUF should equal the amount of data which is removed from the output buffer OBUF during the period concerned. The second term of the picture-coding estimation PCE represents a value for the quantization parameter QPAR with which, based on past encoding experience, this target should be achieved.

It should be noted that initial value VALint of the group coding target GCT depends on the joint bit-rate control messages received by the encoder. It has been explained hereinbefore with reference to FIG. 3, that these joint bit-rate control messages define a bit rate profile for the encoder. The bit-rate profile determines the amount of bits the number of bits which will be outputted from the output buffer OBUF during a period covering the current picture and the N−1 subsequent pictures. Since this number of bits is the group coding target GCT, the joint bit-rate control messages thus define this target. Consequently, the picture coding estimation PCE depends on the joint bit-rate control messages.

In a step S4, a predicted buffer fullness BF[nextI] at the next I-picture is calculated. The predicted buffer fullness BF[nextI] is based on the initial value VALint for the group-coding target GCT and the picture-coding estimation PCE derived therefrom. The predicted buffer fullness BF[nextI] is the current fullness BF[now] of the output buffer plus a sum Σ of picture-coding estimations which comprises a picture-coding estimation PCE for each picture until the next I-picture, minus the number of bits OUT[nextI] which will be outputted from the output buffer until the next I-picture.

In a step S5, a buffer fullness surplus ΔBF is calculated. The buffer fullness surplus ΔBF is the difference between the predicted buffer fullness BF[nextI] and a desired buffer fullness BF[des] at the next I picture. The desired buffer fullness BF[des] is preferably defined in such a manner that it corresponds to an input buffer at a decoding end being substantially filled with data just before decoding the I picture.

In a step S6, an adapted value VALadp for the group encoding-target GCT is calculated. The adapted value VALadp for the group encoding-target GCT is the initial value for VALint the group encoding-target GCT, which is the number of bits which will be outputted from the output buffer during a period covering the current picture and the subsequent N−1 pictures, minus the buffer fullness surplus ΔBF.

In a step S7, a picture encoding-target PCT is calculated for encoding the current picture. The picture encoding-target PCT is based on the adapted value VALadp of the group encoding-target GCT in the same manner as the picture-coding estimation PCE is based on the initial value VALint of the group encoding-target GCT. The picture encoding target PCT is a product of a first term and a second term. The first term is the picture complexity PCX belonging to the type of the picture to be encoded, I, B or P, divided by the weighing factor K used for that type. The second term is the adapted value VALadp for the group encoding target GCT divided by the group-of-pictures complexity GCX.

In a step S8, the picture encoding target PCT is verified so as to obtain a verified picture encoding target PCTver. In this step, it is checked whether or not an underflow or an overflow will occur at a decoding end if the encoding of the current picture produces a number of bits equal to the picture encoding target PCT. If there is neither underflow nor overflow, the verified picture encoding target PCTver will equal the picture encoding target PCT, that is, the picture encoding target PCT is not changed. If, however, the picture encoding target PCT will lead to underflow or overflow, the picture encoding target PCT is effectively clipped in replacing it by a value for which neither underflow nor underflow occurs.

In a step S9, the quantization parameter value QPAR is controlled during the encoding of the current picture in the following manner. The quantization parameter value QPAR is the sum of a first term and a second term. The first term is the picture complexity PCT of the type concerned divided by the verified picture encoding target PCTver. The second term is the product of a deviation-from-target ΔTGT and a reaction parameter RP. The deviation-from-target ΔTGT is the number of bits NOBP produced thus far by encoding the current picture, minus the verified picture encoding target PCTver multiplied by the ratio of the time lapsed thus far t-t0 in encoding the current picture, and the picture period Tp. The reaction parameter RP is 512 divided by the bit-rate R of the MPEG data stream DS.

With regard to the quantization parameter control QPAR, the following is noted. The first term is a global or long-term strategy for controlling the quantization parameter value QPAR. Let is be assumed that the picture encoding target is not clipped, meaning that the verified picture encoding target PCTver equals the picture encoding target PCT. In that case, the first term corresponds to the weighing factor K for the picture concerned multiplied by the group-of-pictures complexity GCX divided by the adapted value VALadp of the group encoding-target GCT. The group-of-pictures complexity GCX consists of a sum of products of "number of bits actually produced in the recent past" and "the quantization parameter which was applied". Thus, the first term effectively represents a value for the quantization parameter QPAR which, based on past experience, is expected to result in a number of desired bits. The second term is a local or short-term strategy for adjusting the quantization parameter QPAR. It is a kind of safety measure which prevents the encoding from producing a number of bits which deviates to a relatively large extent from the targeted number of bits being the verified picture encoding target PCTver.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this by no means excludes the implementation of some functional elements or all functional elements as a single physical unit. For example, the output buffers of the encoders shown in FIG. 3 may be implemented as a single memory circuit as described in the International Application published under number WO 96/20568.

Although FIG. 8 illustrates an example of a method of quantization parameter control on the basis of the output bit rate, this by no means excludes other methods of quantization parameter control. All what matters, is that the extent of compression, which in the FIG. 8 method is controlled by a means of target, is calculated on the basis of the output bit rate.

Any reference sign in a claim should not be construed as limiting the claim.

What is claimed is:

1. A method of controlling a data compression assembly having several data-compression channels (DCC), a data-compression channel (DCC) comprising:
   a data compressor (CMP) for compressing input data (D) so as to obtain compressed data (Dc);
   a buffer-memory space (BUF) for temporarily storing the compressed data (Dc) and for providing the compressed data (Dc) in the form of an output data stream (DS); characterized in that the method comprises the steps of:
   establishing indications (IND) of compressed-data quality (Q[Dc]) versus extent of compression (E[CMP]) for respective data-compression channels (DCC);
   partitioning (JBRC) a total output bit rate (Rtot) over respective output data streams (DS) in dependence on the indications (IND);
   controlling (CON) the extent of compression in respective data-compression channels (DCC) individually on the basis of output data stream bit rate (R) and amount of compressed data (F) stored in the buffer memory space (BUF).

2. A method of controlling as claimed in claim 1, characterized in that for a data-compression channel (DCC) it comprises the steps of:
   a first data compression (DC1) for establishing the indication (IND) of compressed-data quality (Q[Dc]) versus extent of compression (E[CMP]), and
   a second data compression (DC2) for providing compressed data (Dc) which will form part of the output data stream (DS).

3. A data-compression assembly having several data-compression channels (DCC), a data-compression channel (DCC) comprising:
   a data compressor (CMP) for compressing input data (D) so as to obtain compressed data (Dc);
   a buffer-memory space (BUF) for temporarily storing the compressed data (Dc) and for providing the compressed data (Dc) in the form of an output data stream (DS); characterized in that respective data-compression channels (DDC) are arranged to:
   control (CON) the extent of compression individually on the basis of output data stream bit rate (R) and amount of compressed data (F) stored in the buffer-memory space (BUF);
   establish indications (IND) of compressed-data quality versus extent of compression;

and in that the data-compression assembly comprises a joint bit-rate controller (JBRC) for partitioning a total output bit rate (Rtot) over respective output data streams (DS) in dependence on the indications (IND).

4. A computer program product for a data-compression assembly having several data-compression channels (DCC), a data-compression channel (DCC) comprising:

a data compressor (CMP) for compressing input data (D) so as to obtain compressed data (Dc);

a buffer-memory space (BUF) for temporarily storing the compressed data (Dc) and for providing the compressed data (Dc) in the form of an output data stream (DS); and control circuitry (JBRC, CON);

the computer program product being characterized in that it comprises a set of instructions which, when loaded into the control circuitry (JBRC, CON), causes the data-compression assembly to carry out the method as claimed in claim 1.

5. A method of controlling a video-encoding assembly having several video-encoding channels (ENC), a video-encoding channel (ENC) comprising:

video-encoding circuitry (EC) for encoding video data so as to obtain encoded video data;

a buffer memory space (OBUF) for temporarily storing the encoded video data and for providing the encoded video data in the form of an output data stream (MDS); characterized in that the method comprises the steps of:

establishing (GS2) picture-complexity indications (IND) for the respective video-encoding channels, a picture-complexity indication (IND) for a video-encoding channel relating to an average complexity of pictures (AVX) to be encoded by that video-encoding channel;

partitioning (GS3–GS6) a total output bit rate (Rtot) over respective output data streams (MDS) in dependence on the picture-complexity indications (IND); and, within a video-encoding channel (ENC), determining (S1–S6) a target (GCT) for a group of pictures to be encoded on the basis of the output data stream bit rate of the video encoding channel and the amount of encoded video data contained in the buffer memory space;

deriving (S7,S8) a target (PCT) for a current picture to be encoded from the target (GCT) for the group of pictures; and controlling (S9) the video encoding circuitry (EC) on the basis of the target (PCT) for the current picture so that the encoding of the current picture produces an amount of encoded video data which is substantially equal to said target.

* * * * *